United States Patent

Bratka

[15] 3,636,274

[45] Jan. 18, 1972

[54] TAPE MACHINE HEAD CAP REMOVABLY MOUNTABLE FOR WEAR PREVENTION

[72] Inventor: John D. Bratka, 333 No. Spruce, Valley, Nebr. 68064

[22] Filed: Nov. 20, 1969

[21] Appl. No.: 878,391

[52] U.S. Cl. ..............179/100.2 C, 340/174.1 F, 346/74 MC

[51] Int. Cl. ..........................................................G11b 5/40

[58] Field of Search...........179/100.2 C, 100.2 CA, 100.2 P; 346/74 MC; 340/174.1 F; 274/11 E

[56] References Cited

UNITED STATES PATENTS

| | | | |
|---|---|---|---|
| 3,197,210 | 7/1965 | Atsumi | 179/100.2 C |
| 3,526,885 | 9/1970 | Anderson | 179/100.2 C |

*Primary Examiner*—Bernard Konick
*Assistant Examiner*—Alfred H. Eddleman
*Attorney*—Henderson & Strom

[57] ABSTRACT

A head cap adapted for use with a tape machine having a plurality of heads which contact the tape, wherein the head cap is removably mountable between at least one of the heads and the tape, thus holding the tape away from the head for preventing unnecessary wear thereto.

8 Claims, 6 Drawing Figures

PATENTED JAN 18 1972

3,636,274

INVENTOR.

JOHN D. BRATKA

BY

Henderson & Strom

ATTORNEYS

TAPE MACHINE HEAD CAP REMOVABLY MOUNTABLE FOR WEAR PREVENTION

BACKGROUND OF THE INVENTION

A tape machine employs the use of one or more tape heads, each head installed for a particular purpose. In some commercially available tape dictating machines, there is generally a record head, an erase head, and a playback head. One common function of all tape heads is that of providing a contact surface against which a tape surface may be relatively moved, thereby effecting the function peculiar to the individual head.

A commercially available tape recorder machine contains a head bank comprised of three individual heads located in an arcuate plane, whereby the contact surfaces of the heads are aligned contiguous to the tape track allowing the machine to operate at the discretion of the operator in any one of three capacities; i.e., erase, record, or playback, by choosing the particular head that is to function as the tape progresses along its track. No matter in which capacity the machine is operating, the tape makes simultaneous contact with all three heads, the choice of function being controlled by way of the internal circuitry of the machine. Since proper operation of the machine in a playback condition requires the tape to make contact with only the playback head, the simultaneous contact made with one or more additional heads is unnecessary and in fact undesirable because of the additional wear on the head and possibly the tape, thus causing a deterioration of the frequency response and hence a deterioration of the sound quality produced by the machine.

The head cap provided in this invention is designed to protect from unnecessary wear the heads that are not, at a particular time, performing their particular function, and in particular to protect the record and erase heads while the machine is operating in a playback capacity. This is accomplished by manually inserting a cap contiguous to the heads to be protected, with the cap providing a cover for the heads on one side, and a smooth surface over which the tape may move on the other side.

SUMMARY OF THE INVENTION

This invention relates to a head cap adapted to a commercially available tape machine, the head cap being manually attached in a position contiguous with the contact surface of at least one head, whereby the head cap provides protection against wear on the head by a traversing tape, which would otherwise make undesirable contact with the head when the machine is in its normal mode of operation.

An object of this invention is to maintain a substantially constant quality of sound produced by a tape machine.

Another object is to protect one or more heads of a tape machine from undesirable wear.

A further object is to provide a head cap attachment for a tape machine which protects the head from undesirable wear.

A still further object is to provide for the manual insertion of a removable head cap into a position contiguous with the contact surfaces of one or more heads.

Yet another object is to provide an alternate, smooth surface over which a tape may traverse.

Still another object of this invention is to protect the record and erase heads against wear by the tape when the machine is in its normal playback operation.

A further object of this invention is the provision of a head cap for a tape-recording and playback machine having an erase head, wherein the tape is separated from the erase head at predetermined times to prevent the accidental or inadvertent erasing of the tape.

Another object of this invention is to provide a head cap which is economical of manufacture and extremely effective in use.

These objects and other features and advantages of this invention will become more readily apparent upon reference to the following description when taken in conjunction with the accompanying drawings.

In the drawings, as hereinafter described, a preferred embodiment and modified embodiments are depicted, however, various other modifications and alternate constructions can be made thereto without departing from the true spirit and scope of the invention.

DESCRIPTION OF THE PREFERRED EMBODIMENT

Figure 1:
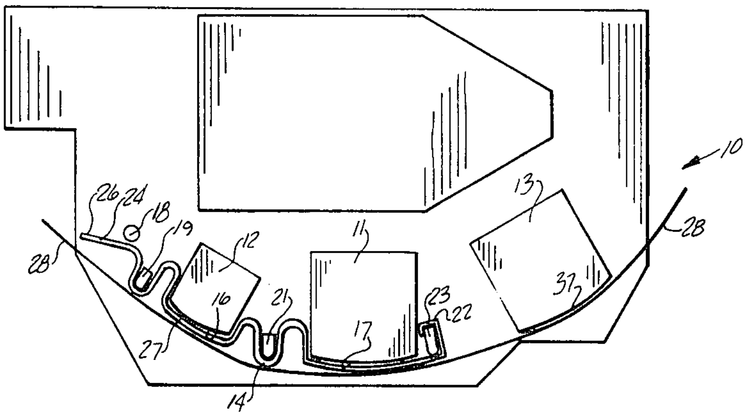
FIG. 1 is a top view of a tape machine head bank with a head cap mounted between two of the heads and the tape.
Figure 2:
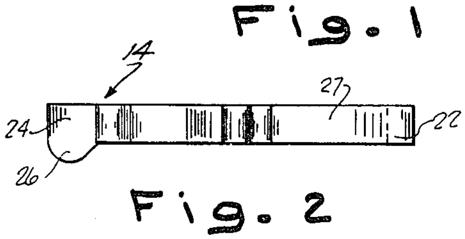
FIG. 2 is a front view of the head cap of FIG. 1.

Referring now to the drawings, FIG. 1 depicts a head bank assembly structure 10 of a tape machine on which three heads are arcuately located; a record head 11, an erase head 12, and a playback head 13. A head cap 14 (FIGS. 1 and 2) of this invention is comprised of a succession of integrally connected, alternately concave and convex sections shaped to conform to contact surfaces 16 and 17 of the record and erase heads 11 and 12, respectively, and to fit securely around guide posts 18, 19 and 21. End 22 of the cap 14 is removably secured around a retainer pin 23, which is a permanent installation on the face of the assembly structure 10, and the opposite end 24 is free to be used as a handle for inserting or removing the head cap. The curved edge of surface 26 of the cap 14 is disposed against the face of the assembly structure 10 so as to render the end 24 graspable.

The fabrication of the head cap may be of any flexible material such as plastic or aluminum, but its purpose is best served by a material somewhat flexible in nature, so as to retain its shape and fit as above described after many insertions and removals. The portions of the inside surface of the head cap 14 which fit against the head contact surfaces 16 and 17 are smooth and may have a portion of rubberized standard electrician's tape or the like applied thereto for the purpose of added protection against wear to the delicate contact surfaces. The opposite, outside surface 27 of the head cap, over which the tape 28 traverses, must be smooth at all convex portions making contact with the tape, thereby introducing as little resistance as possible to the movement of the tape. The outside surface 27 may also have a similar tape or coated surface, as applied to the inside surface, affixed thereto to reduce wear on the tape sliding thereover.

Figure 3:
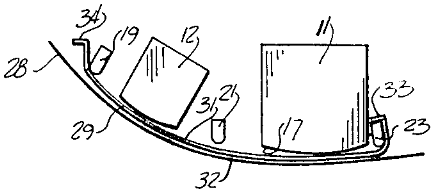
FIG. 3 is a top view of a first modification of the head cap as installed relative to the head bank.
Figure 4:
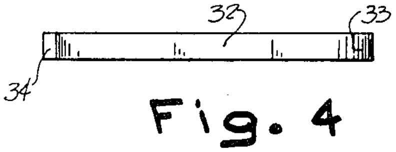
FIG. 4 is a front view of the head cap of FIG. 3.

FIGS. 3 and 4 illustrate an installed version of a first modified embodiment of a head cap 29 which comprises a curvilinear flat portion having an inside surface 31 and an outside surface 32 connected to an L-shaped portion 33 at one end which attaches to the retainer pin 23, and a straight portion 34 at the opposite end. The head cap 29 is removably secured around the guide posts 19 and 23 and held in place by a slight tension in the head cap of resilient material. The inside surface 31 is contiguous with the contact surfaces 16 and 17 of the record and erase heads 12 and 11 respectively, and may have electrician's tape applied thereto for additional protection to the heads. The outside surface 32 of the head cap is substantially contiguous throughout its length to the traversing tape 28 and must be a smooth surface. The surface 32 may also have a smooth coating applied thereto for protection of the tape.

Figure 5:
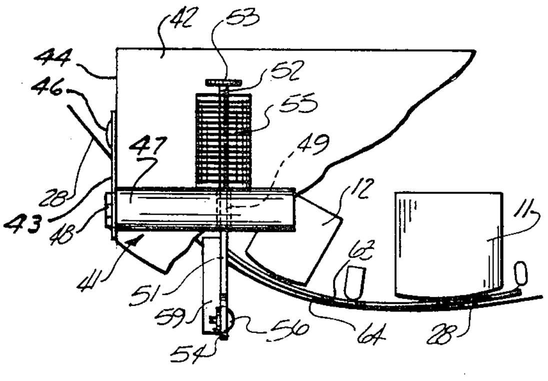
FIG. 5 is a fragmentary top view of the assembly structure cover to which a second modification of the head cap assembly is attached.
Figure 6:
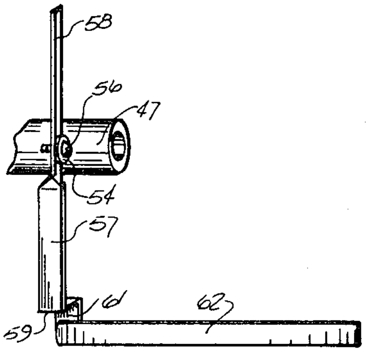
FIG. 6 is a perspective view of the head cap assembly of FIG. 5.

A second modified embodiment of the head cap is shown by the assembly 41 (FIGS. 5 & 6). Generally each head bank assembly has a cover 42 mounted thereover to protect the heads and to provide an aesthetic appearance to the tape deck. The heads are disposed under the cover and a portion of the front wall is removed to allow the tape to pass therethrough to contact the heads. The assembly 41 comprises an upstanding member 43 secured to the sidewall 44 of the cover by a screw 46 or the like. A post 47 is secured on one end thereof by a screw 48 to the member 43 and projects over the top of the cover 42. Formed laterally through the post 47, parallel to the plane of the top surface of the cover, is an opening 49 which slidably receives a rod 51. One end 52 of the rod projects rearwardly of the post and has a flanged end 53 or the like. Disposed over the end 52 between the post and the flange is a spring 55 for biasing the forward end 54 of the rod against the post. The forward end 54 has an opening formed therein for receiving a bolt and nut assembly 56.

Pivotally mounted to the forward end 54 of the rod 51 is an arm 57 which normally depends therefrom. Integrally secured at the upper part of the arm is a handle 58 which projects above the rod forward end 54. Projecting rearwardly under the cover and disposed perpendicular to the arm lower end in a normal position, and integral with the arm lower end is an L-shaped bar 59. The short leg 61 of the bar depends therefrom and is integral with one end of a curvilinear head cap 62 which projects normally to the short leg 61. The head cap 62, in a normal position, is adapted to be disposed between the heads and the tape. It will be noted that the head cap of this modification is substantially identical to the head cap of the embodiment depicted in FIG. 3. The head cap 62 is formed from a light, flexible material having an inside surface 63 which is substantially contiguous to the contact surfaces of the erase and record heads, and having an outer surface 64 over which the tape traverses.

In operation of the embodiment of FIGS. 5 and 6, the tape must first be moved from a position in contact with the heads to a position spaced apart from the heads to allow the head cap to be pivoted into a normal position, i.e., in contact with the heads. To move the head cap into its normal position, a slight pressure is applied to the flange 53 against the bias of the spring, thus compressing the spring and allowing the forward end of the rod 51 to move outwardly from the post 47. The handle is then grasped and pivoted, which causes the head cap to pivot into position against the heads. Then the pressure against the flange 53 is released and the head cap remains tightly disposed against the heads. The tape must then be rewound on one of its reels to draw it against the outside surface of the head cap. To disengage the head cap, a reverse procedure to that hereinabove described is followed.

I claim:

1. A head cap for a tape machine having a plurality of heads adapted to contact a tape and guide posts and guide pins disposed adjacent the heads, the head cap comprising:

means having an inside surface adapted in part to be in juxtaposition with the contact surfaces of at least one head, and having an outside surface over which the tape slides wherein said means is somewhat flexible so as to retain its shape and fit after many insertions and removals between said at least one head and said tape; and an L-shaped end integral with said means for removable securement to a guide pin and a free end integral with and disposed substantially normal to said means for engagement with a guide post, said free end to serve as a graspable handle for insertion and removal of said means between said at least one head and said tape.

2. A head cap as defined in claim 1 wherein said means has a plurality of convex and concave sections shaped to conform to said contact surfaces and to fit securely against the guide posts.

3. A head cap as defined in claim 2 including a smooth coating affixed to at least one of said surfaces.

4. A head cap as defined in claim 1 wherein said means is curvilinear in shape between said L-shaped end and said free end.

5. A head cap as defined in claim 4 including a smooth coating affixed to at least one of said surfaces.

6. A head cap for a tape machine having a plurality of heads adapted to contact a tape and guide posts and guide pins disposed adjacent the heads, the head cap comprising:

means having an inside surface adapted in part to be in juxtaposition with the contact surfaces of at least one head having an outside surface over which the tape slides; and an upstanding member secured to the tape machine adjacent said at least one head, holding means secured to said member, and arms means having one end integral with said means and having the other end pivotally connected to said holding means wherein said means is pivotal from a normal position disposed between said at least one head and said tape to a second position removed from said at least one head and said tape.

7. A head cap as defined in claim 6 wherein said holding means includes a post secured to the upper end of said member and projecting horizontally therefrom, said post having an opening formed therethrough, a rod slidably mounted in said opening with one end of said rod having a flange formed thereon, and a spring mounted on said rod between said post and said flange, said arm means pivotally connected to the other end of said rod, wherein said means is adapted to be moved away from said head in a horizontal plane and swung arcuately about said other end of said rod.

8. A head cap as defined in claim 7 including a handle integral with said arm means other end and projecting generally upwardly therefrom for grasping to manually move said means from said normal position to said second position and back to said normal position.

* * * * *